US010880209B2

(12) United States Patent
Baddeley et al.

(10) Patent No.: US 10,880,209 B2
(45) Date of Patent: Dec. 29, 2020

(54) CONTROLLER FOR, AND A METHOD OF PROCESSING DATA OVER, A LOW-POWER, WIRELESS SOFTWARE DEFINED NETWORKING, SDN, ARCHITECTURE

(71) Applicant: Kabushiki Kaisha Toshiba, Minato-ku (JP)

(72) Inventors: Michael Baddeley, Bristol (GB);
Usman Raza, Bristol (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 16/176,659

(22) Filed: Oct. 31, 2018

(65) Prior Publication Data

US 2020/0136964 A1    Apr. 30, 2020

(51) Int. Cl.
| | | |
|---|---|---|
| *H04L 12/715* | (2013.01) | |
| *H04L 12/803* | (2013.01) | |
| *H04L 27/26* | (2006.01) | |
| *H04L 12/24* | (2006.01) | |
| *H04L 12/721* | (2013.01) | |

(52) U.S. Cl.
CPC .......... *H04L 45/64* (2013.01); *H04L 27/2666* (2013.01); *H04L 41/12* (2013.01); *H04L 45/38* (2013.01); *H04L 47/125* (2013.01)

(58) Field of Classification Search
CPC ....................................................... H04L 45/64
See application file for complete search history.

(56) References Cited

U.S. PATENT DOCUMENTS

| | | | | |
|---|---|---|---|---|
| 2016/0156513 | A1* | 6/2016 | Zhang | H04W 4/70 709/220 |
| 2017/0290013 | A1* | 10/2017 | McCoy | H04L 5/005 |
| 2017/0346724 | A1* | 11/2017 | Calin | H04L 45/24 |
| 2018/0359337 | A1* | 12/2018 | Kodaypak | H04L 67/18 |

OTHER PUBLICATIONS

S. Costanzo, L. Galluccio, G. Morabito, and S. Palazzo, "Software defined wireless networks: Unbridling SDNs," in 2012 European Workshop on Software Defined Networking, Oct 2012, pp. 1-6.
L. Galluccio, S. Milardo, G. Morabito, and S. Palazzo, "SDN-WISE: Design, prototyping and experimentation of a stateful SDN solution for wireless sensor networks," in 2015 IEEE Conference on Computer Communications (Infocom), Apr. 2015, pp. 513-521.

(Continued)

*Primary Examiner* — Jason E Mattis
(74) *Attorney, Agent, or Firm* — Oblon, McClelland, Maier & Neustadt, L.L.P.

(57) ABSTRACT

The present subject-matter provide a controller for a low-power, wireless, software defined networking, SDN, architecture. The controller comprises a processor and a memory storing instructions for execution by the processor. The instructions, when executed by the processor cause the controller to implement: a control layer arranged to detect a communication type for processing an application over the network, and translate the communication type into a plurality of phases chosen from a pre-defined set of phases to configure the nodes of the network to respond to the application according to the communication type.

18 Claims, 11 Drawing Sheets

(56) References Cited

OTHER PUBLICATIONS

T. Theodorou and L. Mamatas, "Coral-SDN: A software-defined networking solution for the Internet of things," in 2017 IEEE Conference on Network Function Virtualization and Software Defined Networks (NFVSDN), Nov 2017, pp. 1-2.

M. Baddeley, R. Nejabati, G. Oikonomou, S. Gormus, M. Sooriyabandara, and D. Sirneonidou, "Isolating SDN control traffic with layer-2 slicing in 6tisch industrial iot networks," in 2017 IEEE Conference on Network Function Virtualization and Software Defined Networks (NFVSDN), Nov. 2017, pp. 247-251.

F. Ferrari, M. Zimmerling, L. Thiele, and O. Saukh, "Efficient network flooding and time synchronization with glossy," in Proceedings of the 10th ACM/IEEE International Conference on Information Processing in Sensor Networks, Apr. 2011, pp. 73-84.

T. Istomin, A. L. Murphy, G. P. Ricco, and U. Raza, "Data prediction + synchronous transmissions=ultra-low power wireless sensor networks," in Proceedings of the 14th ACM Conference on Embedded Network Sensor Systems CD-ROM, ser. SenSys '16. ACM, 2016, pp. 83-95. [Online]. Available: http://doi.acm.org/10.1145/2994551.2994558.

F. Ferrari, M. Zimmerling, L. Mottola, and L. Thiele, "Low-power wireless bus," in Proceedings of the 10th ACM Conference on Embedded Network Sensor Systems, ser. SenSys '12. ACM, 2012, pp. 1-14. [Online]. Available:http://doi.acm.org/10.1145/2426656.2426658.

\* cited by examiner

CONTROLLER FOR, AND A METHOD OF PROCESSING DATA OVER, A LOW-POWER, WIRELESS SOFTWARE DEFINED NETWORKING, SDN, ARCHITECTURE

FIELD

Embodiments described herein relate generally to software defined networking and in particular to configuring a software defined network.

BACKGROUND

Software defined networking (SDN) enables central programming of different services across a network, including a plurality of interconnected nodes. There have been some SDN architectures which have been implemented for IEE 802.15.4 low power wireless networks. The shared nature of the underlying wireless medium, a need to transmit data over multiple hops, and stringent resource constraints pose significant challenges not present in a conventional wired network.

SDN requires frequent back and forth communication between a central controller and the network nodes. This flow of traffic requires a variety of different communication types, including one-to-one, one-to-many, and many-to-one communication. Current communication protocols, e.g. Routing Protocol for Low-power or Lossy (RPL) networks, are not optimized to deal with more than one communication type, or traffic pattern. For instance, RPL is typically used to implement converge-cast, or many-to-one, traffic. Whilst it is possible to use an extension to extend the available communication types to include one-to-one and one-to-many communication, for example, such extensions incur significant overhead, especially in terms of additional storage required at the network nodes.

For the avoidance of doubt, many-to-one communication, also known as "collection", may be used to allow the controller to gather information from the nodes of the network for understanding the current state and performance of the network. In addition, one-to-one communication, also known as "reaction", may be used to allow nodes to solicit or alert the controller for instructions on how to react to new input or events. Furthermore, one-to-many communication, also known as "configuration", may be used to allow the controller to provide instructions to all nodes within the mesh, or subset thereof.

It is an object of the present disclosure to improve on the prior art.

Arrangements of the present invention will be understood and appreciated more fully from the following detailed description, made by way of example only and taken in conjunction with drawings in which.

SUMMARY

According to an embodiment, there is provided a controller for a low-power, wireless, software defined networking, SDN, architecture, comprising a processor and a memory storing instructions for execution by the processor, the instructions, when executed by the processor causing the controller to implement: a control layer arranged to detect a communication type for processing an application over the network, and translate the communication type into a plurality of phases chosen from a pre-defined set of phases to configure the nodes of the network to respond to the application according to the communication type. Translating the communication type into a plurality of pre-defined phases allows for the network to be configured according to the application to be transmitted over the network, without incurring undesirable overhead.

The communication type may be selected from a list including: one-to-one communication; one-to-many communication; and many-to-one communication.

The controller may configure the nodes to respond to the application by selecting one mode from a list including: source mode; destination mode; and forwarder mode.

The phases may be scheduled in a time synchronous manner. In this way, latency is time bound and a minimum and maximum delay guarantee may be provided to SDN services and applications.

Each phase may include a generic flood primitive to configure each node of the network.

Each phase may include pre and post processing logic, the pre-processing logic may be arranged to modify the generic flood primitive based on the current performance of the network, and the post-processing logic may be arranged to detect a performance of the network in responding to the generic flood primitive. Pre and post processing provide a feedback function to allow the network to adapt to changing circumstances before and after each flooding phase.

Each phase may include a guard time period. The guard time period allows for drift and processing in other nodes.

Each phase may include an offset time period. In this way, the start and end point of a data packet are known.

The controller may be further configured to divide a data processing epoch into a control plane and a subsequent data plane, wherein the controller may be configured to transmit the phases to the network in the control plane, and may be configured to transmit the application data to the network in the data plane.

According to another embodiment, there is provided a low-power, wireless, software defined network, SDN, comprising: a plurality of nodes; and the controller described above arranged to configure the nodes of the network to process the application over the network.

According to another embodiment, there is provided a method of processing data over a low-power, wireless, software defined networking, SDN, architecture, comprising: detecting a communication type for processing an application over the network, and translating the communication type into a plurality of phases chosen from a predefined set of phases to configure the nodes of the network to respond to the application according to the communication type.

The communication type may be selected from a list including: one-to-one communication; one-to-many communication; and many-to-one communication.

The nodes responding to the application may include acting in one mode selected from a list including: source mode; destination mode; and forwarder mode.

The method may further comprise scheduling the phases in a time synchronous manner.

Each phase may include a generic flood primitive to configure each node of the network.

The method may further comprise detecting a performance of the network in responding to the generic floor primitive and modifying a subsequent flooding primitive based on the performance of the network.

The method may further comprise scheduling the phases to include a guard time period.

The method may further comprise scheduling the phases to include an offset time period.

The method may further comprise: dividing a data processing epoch into a control plane and a subsequent data plane, transmitting the phases to the network in the control plane, and transmitting the application data to the network in the data plane.

The method described above may be a computer-implemented method.

According to another embodiment, there is provided a non-transitory memory storing computer program instructions for execution by a processor, the instructions, when executed by the processor, causing the processor to perform the method describe above.

DETAILED DESCRIPTION

Figure 1:
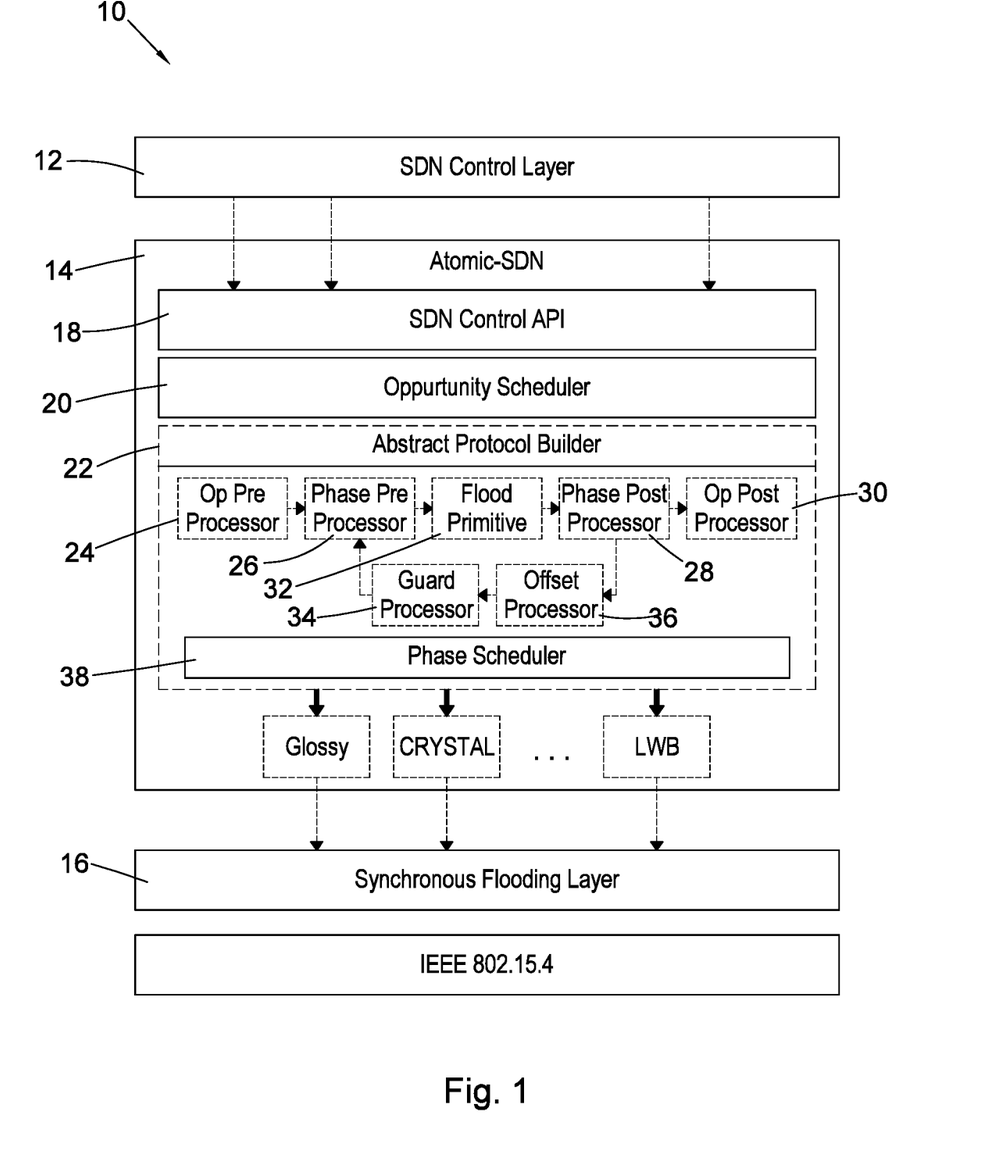
FIG. 1 shows a block diagram of a controller according to an embodiment.

With reference to FIG. 1, the present embodiment relates to a controller 10 for a low-power, wireless, software defined networking (SDN) architecture. The controller 10 includes an SDN control layer 12, an Atomic-SDN layer 14, and a synchronous flooding layer 16.

The controller 10 is arranged to detect a communication type required by an application being processed over the network. The application may require one-to-one communication, many-to-one communication, or one-to-many communication, for example. The SDN control layer 10 is arranged to detect the required communication type and communicate the communication type intent to the Atomic-SDN 14.

The Atomic-SDN 14 includes an SDN control application programming interface (API) 18, an opportunity scheduler 20, and an abstract protocol builder 22.

The SDN control API 18 is arranged to translate the communication type intent from the SDN control layer 10, to an opportunity. The term "opportunity" is used to mean a period in which the controller initiates control across the network. The type of opportunity is chosen by the controller prior to a flooding period. An opportunity includes a set of logic arranged to configure the nodes of the network to transfer data according to one of the abovementioned communication types. The logic is constructed through one or more phase types (described below), along with pre and post processing logic.

A "phase" is a building block of the opportunities. Higher level functions are able to be created through chaining multiple phases into a series of logic decisions. Each phase is a self-contained unit consisting of a flood primitive, configured with N transmissions and duration Tdur, combined with an associated data structure and certain functions which define phase behaviour based on the current node role. The functions include pre and post processing logic, guard to allow for drift and time for processing to occur in other nodes, and offset from an initial phase reference.

Figure 12:
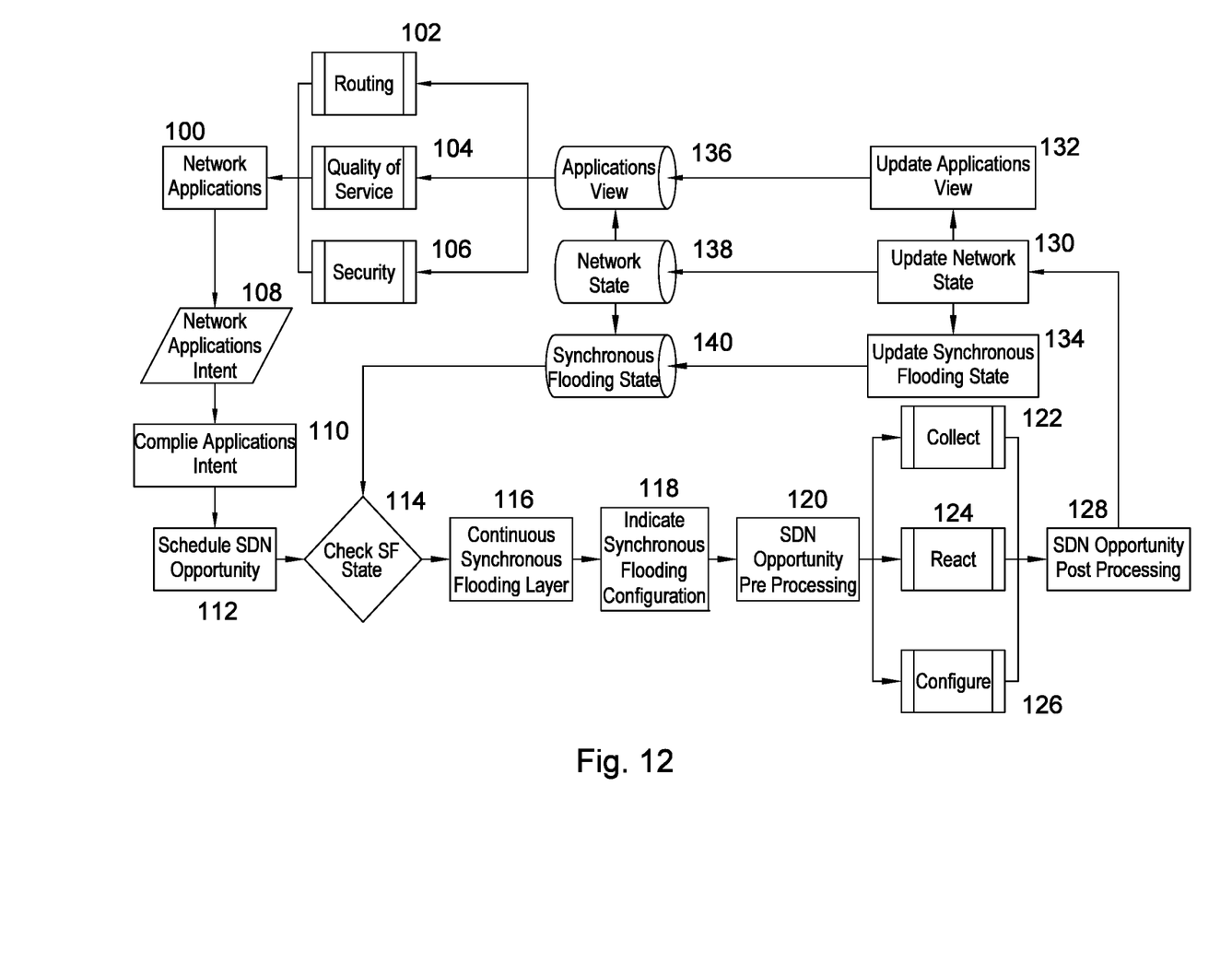
FIG. 12 shows a flow chart of a feedback loop configured through the network.

By defining these functions, phases can be configured to perform a specific, self-contained role, whilst propagating the associated phase packet types (see FIG. 12). Multiple phases can then be chained together in order to build up higher level processes (see FIG. 3), allowing full protocols to be implemented through the combination of a number of simple blocks.

A "flood primitive" is a generic function defined as a flood configured with N number of transmissions and duration Tdur. If a node is able to successfully complete all N transmissions, it will exit the flood process, otherwise it will exit at Tdur. Flood primitives are currently implemented as a one-to-all synchronous flood, however, any lower synchronous flooding layer could conceivably be used.

The opportunity scheduler 20 is arranged to receive the proposed opportunities and schedule the opportunities to a time when they are required in order to process the application. For instance, different stages of the application may require different communication types, and so the opportunity scheduler arranges the opportunities in a time schedule. The abstract protocol builder 22 then creates a protocol according to the opportunity to realise the one-to-one, one-to-many, and many-to-one configuration across the network.

The abstract protocol builder 22 includes: opportunity 24 and phase 26 pre-processors, opportunity 28 and phase 30 post-processors, the generic flood primitive 32 for the phase, and guard 34 and offset 36 processors. The abstract protocol builder 22 also includes a phase scheduler 38.

Functionally, the abstract protocol builder is arranged to determine the phases required to realise the opportunity from the opportunity scheduler and construct a protocol from the selected phases. The opportunity and phase pre-processors 24, 26, are arranged to adapt the flood primitive of the selected phase according to the current network state. The phase and opportunity post-processors 28, 30, are arranged to observe a state of the network resulting from applying the opportunity to the network. The guard and offset processors are arranged to apply the phase guard and offset times to the opportunity. The phase scheduler 38 is arranged to schedule the phases according to the opportunity.

The synchronous flooding layer 16 is arranged to flood the network in accordance with the opportunities.

Figure 2:
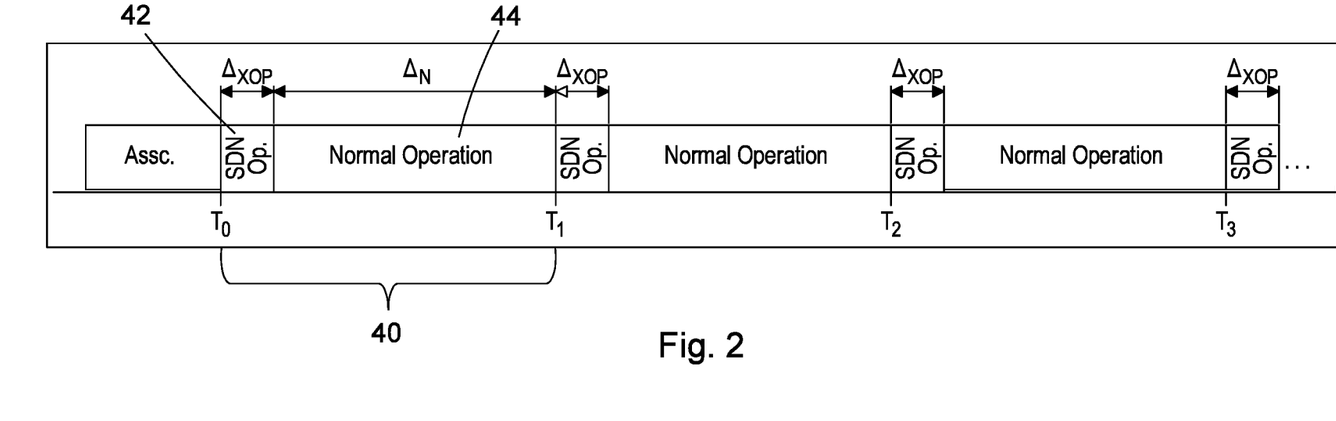
FIG. 2 shows a time line of network operation using the controller from FIG. 1.

FIG. 2 shows a time line of data transmitted over the network. There are three epochs shown in full. An epoch is defined as a period of time between regularly scheduled SDN control opportunities, with periodicity Ti, where a trade-off is considered when setting the epoch length, and consequently the frequency of SDN opportunities. As synchronous flooding periods according to embodiments inherently block other processes, a longer epoch allows a greater amount of time to be devoted to normal network operation; whether that is application processes or to allow nodes to sleep and therefore conserve energy.

With reference to FIG. 2, an epoch 40 includes a period of SDN operation 42, and a period of normal operation 44. During the SDN operation period 42, the SDN controller is arranged to configure the nodes of the network to operate according to one of the communication types. During the normal operation, application data is processed over the network as configured in the selected communication protocol.

Figure 3:
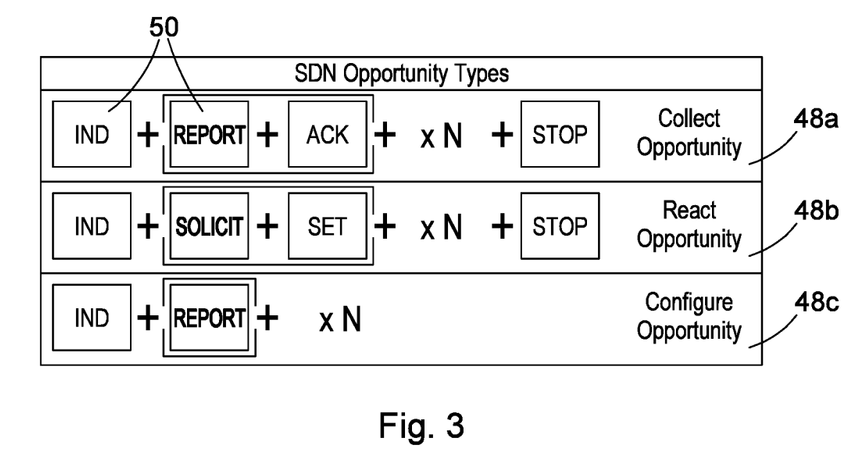
FIG. 3 shows a set of opportunities denoting communication types to configure the network using the controller from FIG. 1.

With reference to FIG. 3, there are three opportunities 48 a, b, c, used by the controller according to an embodiment. The three opportunities 48 a, b, c, include: "collect opportunity"; "react opportunity"; and "configure opportunity". The collect opportunity corresponds to a many-to-one communication type. In other words, during a collect opportunity, the nodes of the network are configured such that all, or a subset, of the nodes are arranged to transfer data to one designated node. The react opportunity corresponds to a one-to-one communication type. In other words, during a react opportunity, the nodes of the network are configured such that one node is configured to transfer data to another designated node. The configure opportunity is a one-to-many communication type. In other words, during a configure opportunity, one of the nodes in the network is configured to transfer data, and a subset of other nodes are configured to receive the data.

With further reference to FIG. 3, the opportunities 48 a, b, c, include a set of phases 50. The phases 50 include data packets serving a specific function. The specific phases used for each opportunity are selected from a pre-determined set of phases. Each opportunity starts with an indication phase (IND). The indication phase (IND) is a one-to-many phase and is arranged to communicate the opportunity type, and duration of the control period, to the rest of the network.

Figure 4:
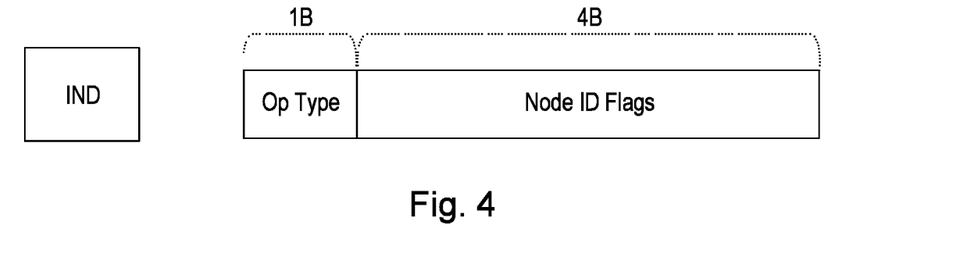
FIG. 4 shows a data format of the phases.

FIG. 4 shows a message format of a phase 50, in this case an indication phase (IND). The opportunity type is communicated first in the Op Type field 1B, followed by data relating to the node ID flags in field 4B. The message size is described as 5 Bytes; 1 Byte for the opportunity type, and four Bytes for the node ID flags.

Figure 5:
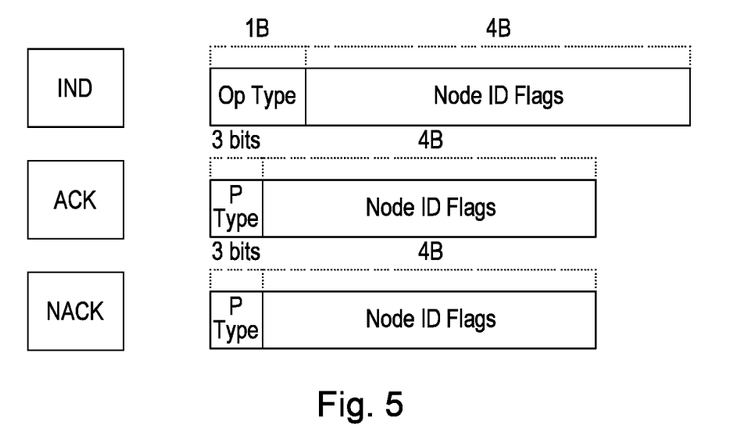
FIG. 5 shows a set of one-to-all phase types.

FIGS. 5-8 show phases according to different communication types. FIG. 5 shows phases where one node communicates a data packet to all of the other nodes, i.e. one-to-all phase types. In particular, there are Indication (IND), Acknowledge (ACK), and Negative-Acknowledge (NACK) phases. The IND phase is used for time synchronization of the network, and indicating the type of opportunity that the network will run next (i.e. collect/configure/react). Nodes can then make their own decision if they will participate as a source, a destination, or a forwarder. The data packet includes an opportunity type description (op type) and a bit array indicating which nodes are allowed to participate in this opportunity (N.B. non-participating nodes are still forwarders). The bit array indicating the nodes is labelled as "Node ID Flags". The ACK phase is an acknowledgement from the controller to the network. The NACK phase is used as the final phase of an empty collect opportunity. The ACK and NACK phases each include a 3 bit description (although the size of the packet is not limited to 3 bits) of the phase type followed by a similar "Node ID Flags" as included in the IND phase.

Figure 6:
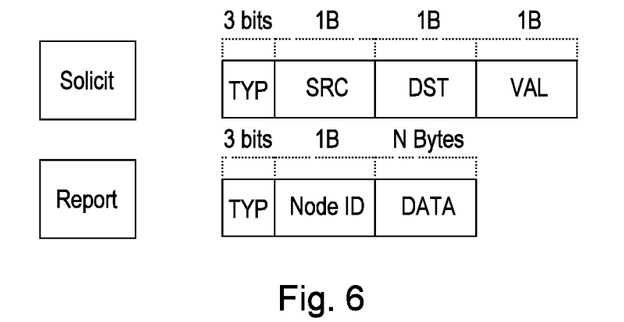
FIG. 6 shows a set of many-to-one phase types.

FIG. 6 shows phases where many nodes transfer information to a single node, i.e. many-to-one communication. In particular, the many-to-one phase types include a solicit phase, and a report phase. The solicit phase is used in the react opportunity. The solicit phase may allow nodes to request information from the controller. The data structure of the solicit phase includes a type of phase (TYP) followed by a source of the packet which this node is soliciting instructions about (SRC), followed by a destination of the packet which this node is soliciting instructions about (DST), and the value of the packet which this node is soliciting instructions about (VAL).

Figure 7:
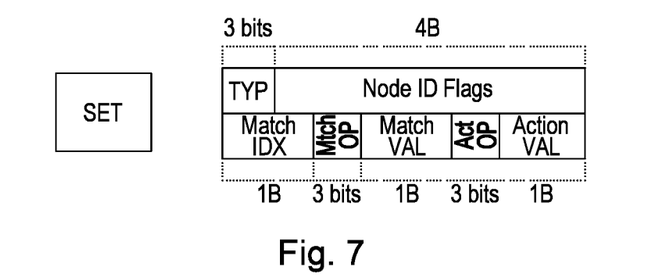
FIG. 7 shows a set of one-to-many phase types.

The report phase is used in the collect opportunity. Report may inform the controller about the state of the node. The repose phase includes a type of phase (TYP) followed by an identifier, ID, of the node (Node ID), then N Bytes of metric data, where type and length of data required by the controller has been pre-configured on association with the network (DATA). FIG. 7 shows phases where many nodes transfer information in a one-to-many type communication. In particular, there is a set phase. The set phase allows the controller to send configuration data to the node. The data structure of the set phase includes a type of phase (TYP) followed by a bit array of nodes which should receive this packet (Node ID Flags). In parallel to those two data packets, there is a field which donates the index on which to perform SDN matching for regular packets labelled "Match IDX", a field which donates the type of SDN matching operation (Equals/Less-Than/Greater-Than . . . ) to perform on regular data packets which match this rule, a field which donates the byte value to match when performing SDN matching for regular data packets labelled "Match VAL", a field which donates the type of SDN action operation (Forward/Drop/Modify/Aggregate . . . ) to perform on regular packets which match this rule labelled "Action Op", and a field which donates a byte value which can be used in conjunction with the SDN action operation (e.g. Forward to X/Drop from Y . . . ) which is labelled "Action VAL".

It is noted that the phases and the opportunities are independently classed in one of the communication types: one-to-many, many-to-one, or one-to-one. However, the type of opportunity may require phases associated with a different communication type. For instance, in order to facilitate many-to-one communication, the opportunity is broken down into multiple phases, with each distinct phase performing a different communication type (in the case of the collect opportunity, the ACK and IND phases are used, which phases are categorised as one-to-all phases). The combination of these phases, and their consecutive traffic patterns, allows the network to perform the reliable many-to-one communication as seen in the collect and react opportunities.

Figure 8:
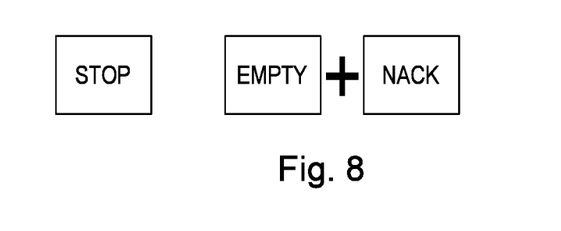
FIG. 8 shows a stop phase-pair.

With reference to FIG. 8, there is also provided a stop phase-pair. The stop phase-pair includes an empty phase and an acknowledge phase. The empty phase is a many-to-one phase, and the acknowledge phase is a one-to-all phase.

Figure 9:
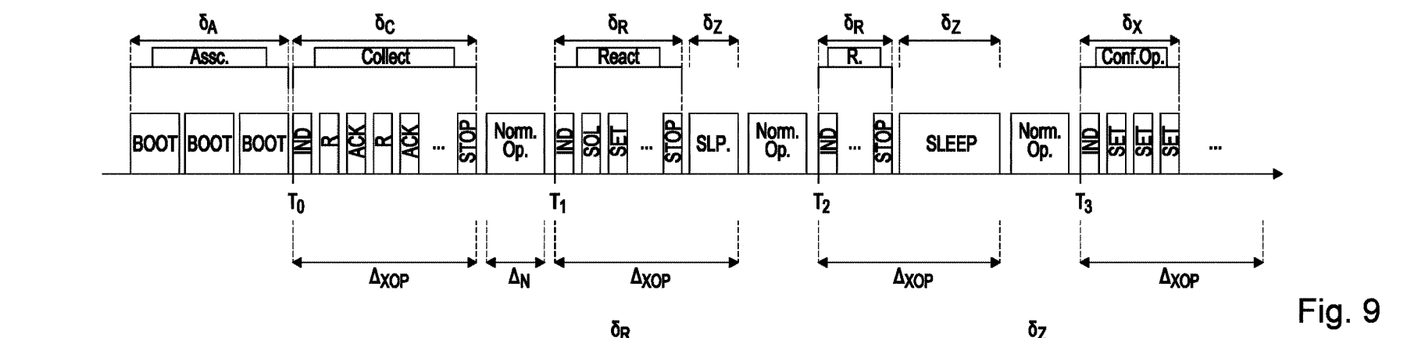
FIG. 9 shows a schedule of opportunities.

With reference to FIG. 9, the phases for each opportunity (see FIG. 3) are scheduled during the SDN operation phase over time Axop, followed by a period of normal operation, where application data is transmitted over the network. Next, the phases of the subsequent opportunity are scheduled during the next SDN operation phase. The phases can be seen as distinct, time synchronous, data packets transmitted to the network.

Figure 10:
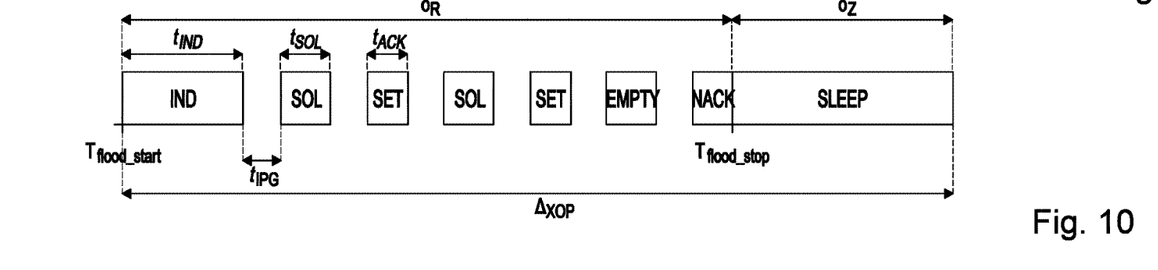
FIG. 10 shows a schedule of the react opportunity from FIG. 9.

With reference to FIG. 10, the phases are bounded by a flood time and are separated according to a time schedule. In this way, the time for transmitting the opportunity to the network is time bounded resulting in time bounded latency. Since the phase structure of each SDN opportunity is known, the controller 10 can provide minimum and maximum delay guarantees (on successful control operations) to SDN services and applications.

Figure 11:
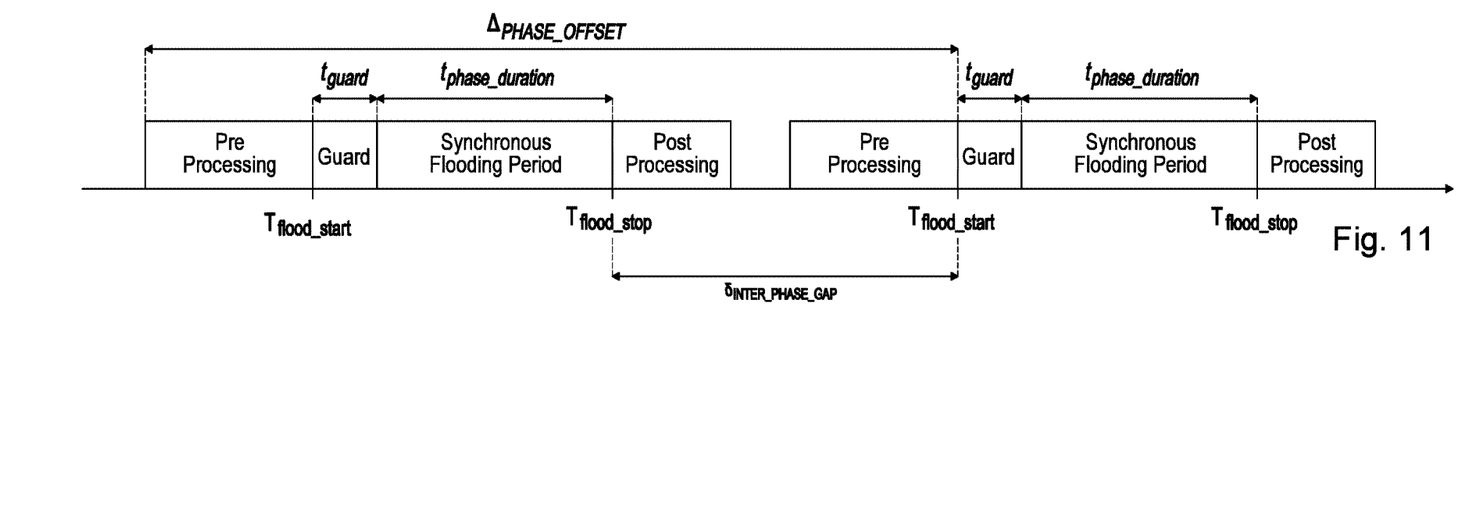
FIG. 11 shows a timing structure of a phase.

With reference to FIG. 11, the SDN opportunity is scheduled to provide for a pre-processing phase, a guard phase, then a synchronous flooding period, and a post processing phase.

With reference to FIG. 12, the pre and post-processing features are best described with reference to the operational flow of the controller.

In step 100, a network application is called which is to be transferred over the network. The application requires a specific routing 102 between nodes, a particular quality of service 104, and is associated with specific security requirements 106. The intent of the application is determined from the network application at step 108, and the application intent is compiled at step 110.

At step 112, the SDN opportunity required to realise the application intent 110 is determined and the SDN opportunity is scheduled. After checking the synchronous flooding state at step 114, the synchronous flooding layer is configured to flood the network with the flooding primitives of the phases of the opportunity at step 116.

At step 118, the SDN opportunity for flooding to the network is indicated. In particular, the network will be flooded according to the collect opportunity 122, the react opportunity 124, or and configure opportunity 126. In this way, the network will be configured according to the chosen opportunity so that subsequent data transfer required by the application can be carried out in an optimised manner.

At step 120, the SDN opportunity is pre-processed.

At step 128, SDN opportunity post-processing occurs, where the state of the network is monitored to see how the network responds to the opportunity.

At step 130, the network state is updated, and also the application view and the synchronous flooding state, are also updated in steps 132 and 134. In particular, the controller includes an application view data base 136, a network state database 138, and a synchronous flooding state database 140 to maintain information relating to the application view, the network state, and the flooding state, respectively. These databases are updated in steps 130, 132, and 134. The application view database can be used to call information relating to routing on the network, quality of service available on the network, and security information of the network.

Figure 13:
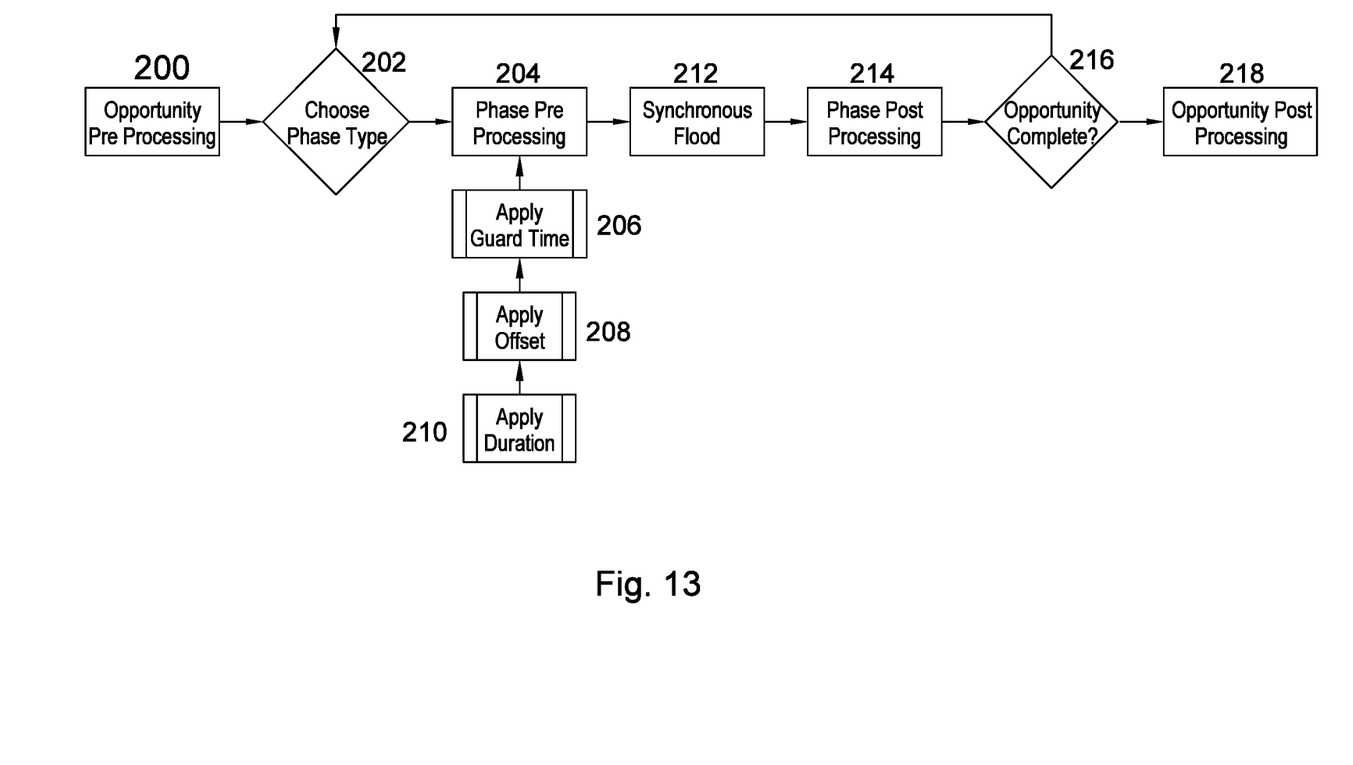
FIG. 13 shows a flow chart of an opportunity.

Phase scheduling for an opportunity is described with reference to the process flow chart in FIG. 13.

At step 200, the opportunity is pre-processed. Once processed, the phases required to realise the opportunity are selected at step 202 (see FIG. 3 for phases required per opportunity). At step 204, the phases are pre-processed according to the network state. The guard time, the offset, and the duration, are applied to the phases at steps 206, 208, and 210. Once the phases have been scheduled, the opportunity is flooded to the network at step 212.

At step 214, the phases are post processed to understand how the network responded to the phases. If the opportunity was completed in the duration, Tdur, the opportunity is post processed (see above). If the opportunity was not completed, the process reverts back to step 202.

Figure 14:
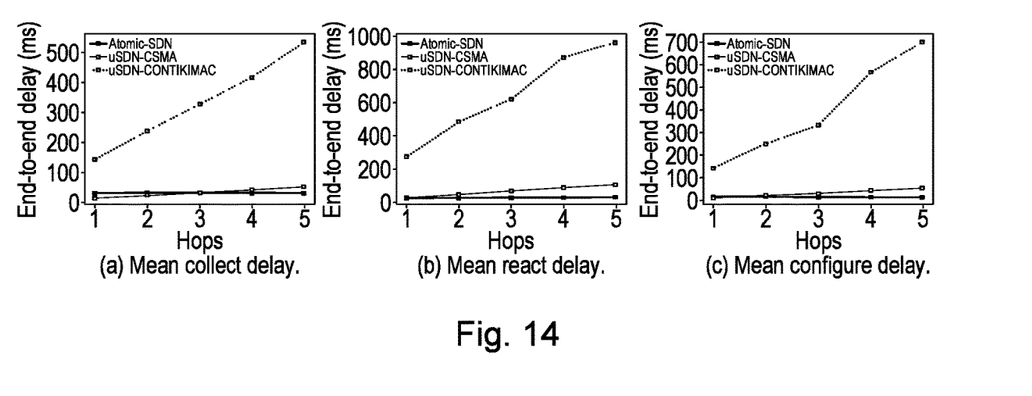
FIG. 14 shows a latency profile at each hop for the controller from FIG. 1 compared to two conventional controllers.
Figure 15:
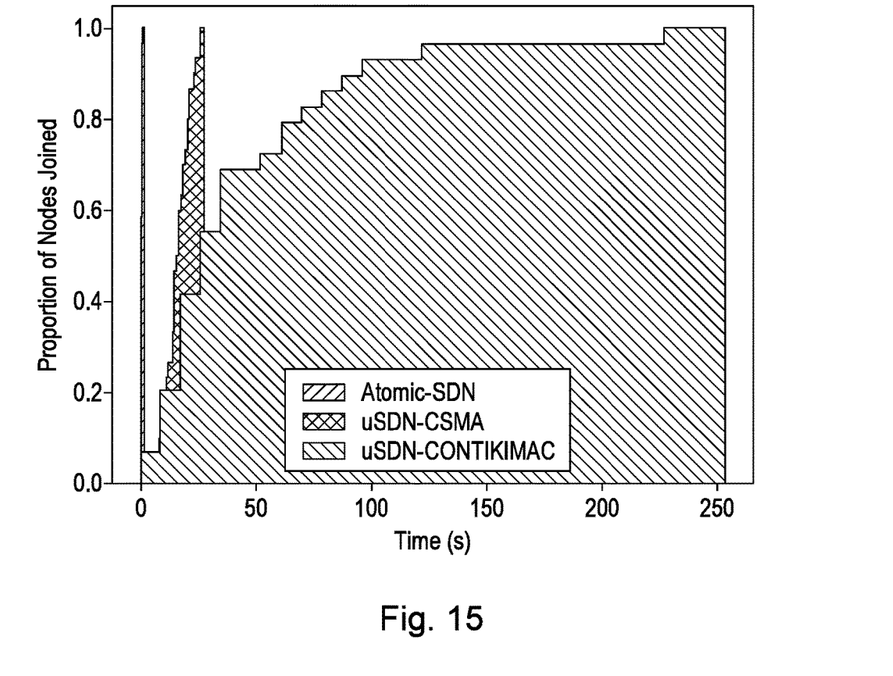
FIG. 15 shows the time to join nodes in a network using the controller from FIG. 1 compared to two conventional controllers.
Figure 16:
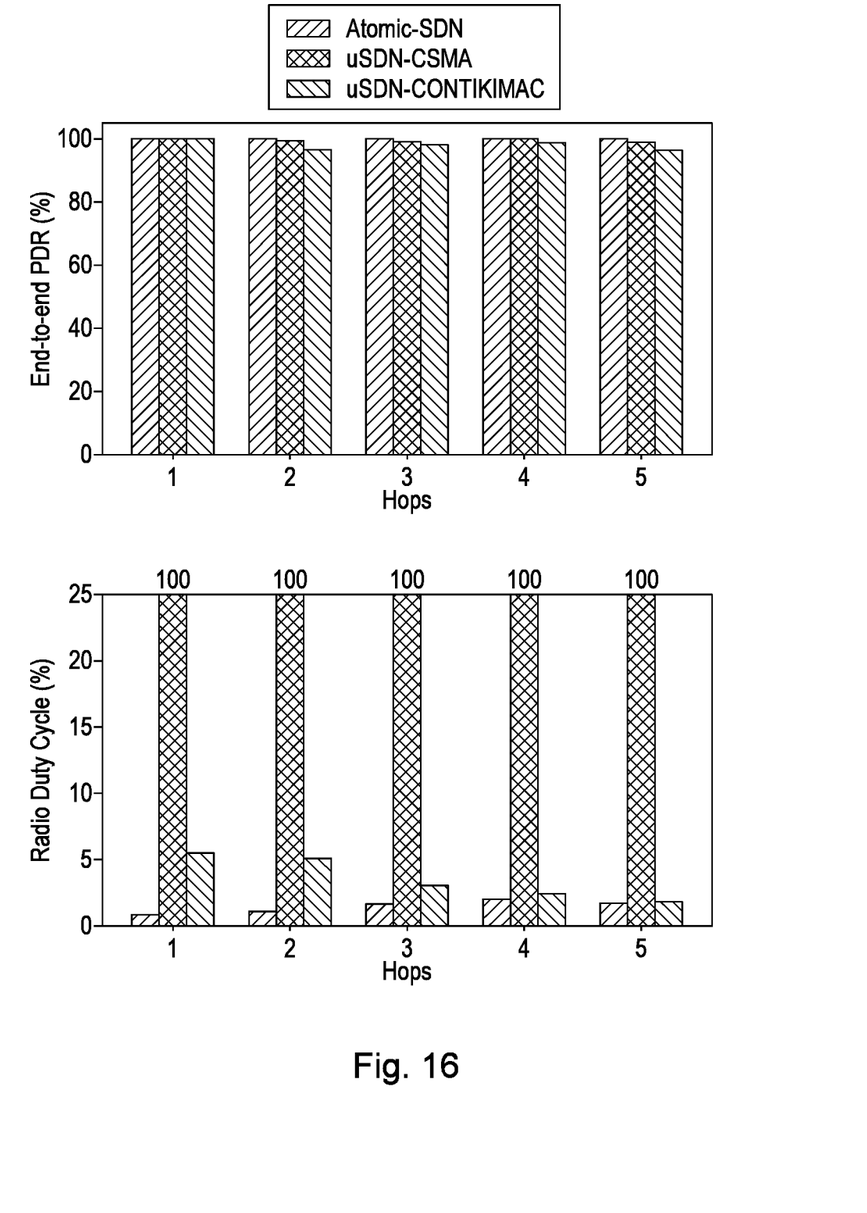
FIG. 16 shows the end-to-end PDR and radio duty cycle for the controller from FIG. 1 compared to two conventional controllers.

The benefits of the controller 10 according to embodiments are best understood with reference to the test results shown in FIGS. 14-16.

With reference to FIG. 14(*a*), the mean collect delay is shown as being lower above 3 hops compared to the uSDN-CSMA and uSDN-CONTIKIMAC protocols. With reference to FIG. 14(*b*), the mean react delay is shown as being lower above 1 hop compared to the uSDN-CSMA and uSDN-CONTIKIMAC protocols. With reference to FIG. 14(*c*), the mean configure delay is shown as being lower above 2 hops compared to the uSDN-CSMA and uSDN-CONTIKIMAC protocols.

With reference to FIG. 15, the proportion of nodes joined over time is shown. The time for joining all nodes according to the present, Atomic-SDN, controller is shown as almost instantaneous, whereas the uSDN-CSMA and uSDN-CONTIKIMAC protocols exhibit slower times.

With reference to FIG. 16, the end-to-end PDR (%) and the radio duty cycle (%) are shown against the number of hops.

Figure 17:
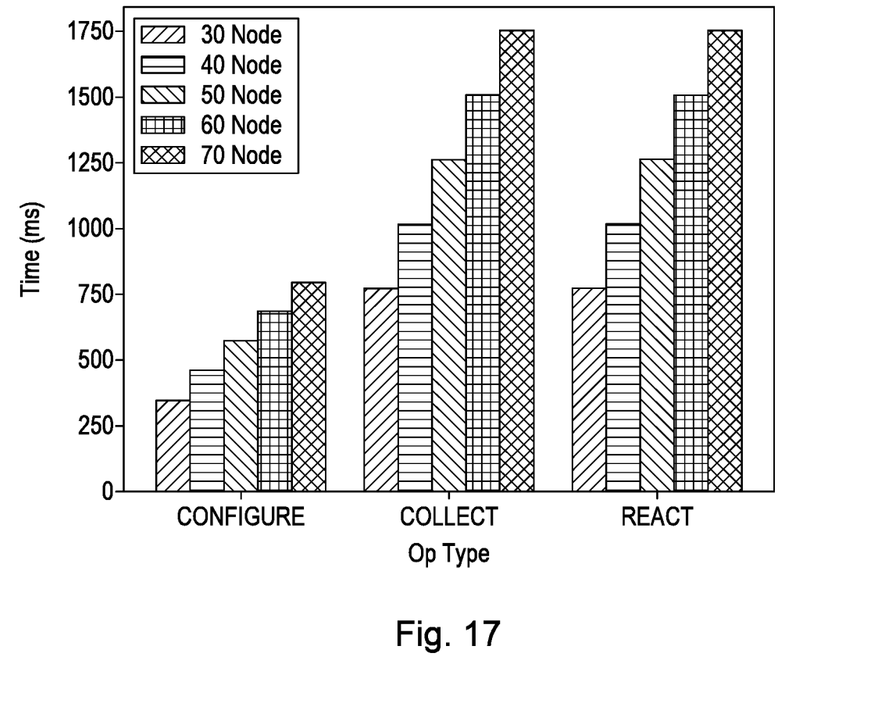
FIG. 17 shows the scalability of the opportunity types using the controller from FIG. 1.

With reference to FIG. 17, the scalability of the present, Atomic-SDN, controller, is shown for each opportunity type. For instance, the time to scale the opportunity per hop is shown to be substantially linear.

Figure 18:
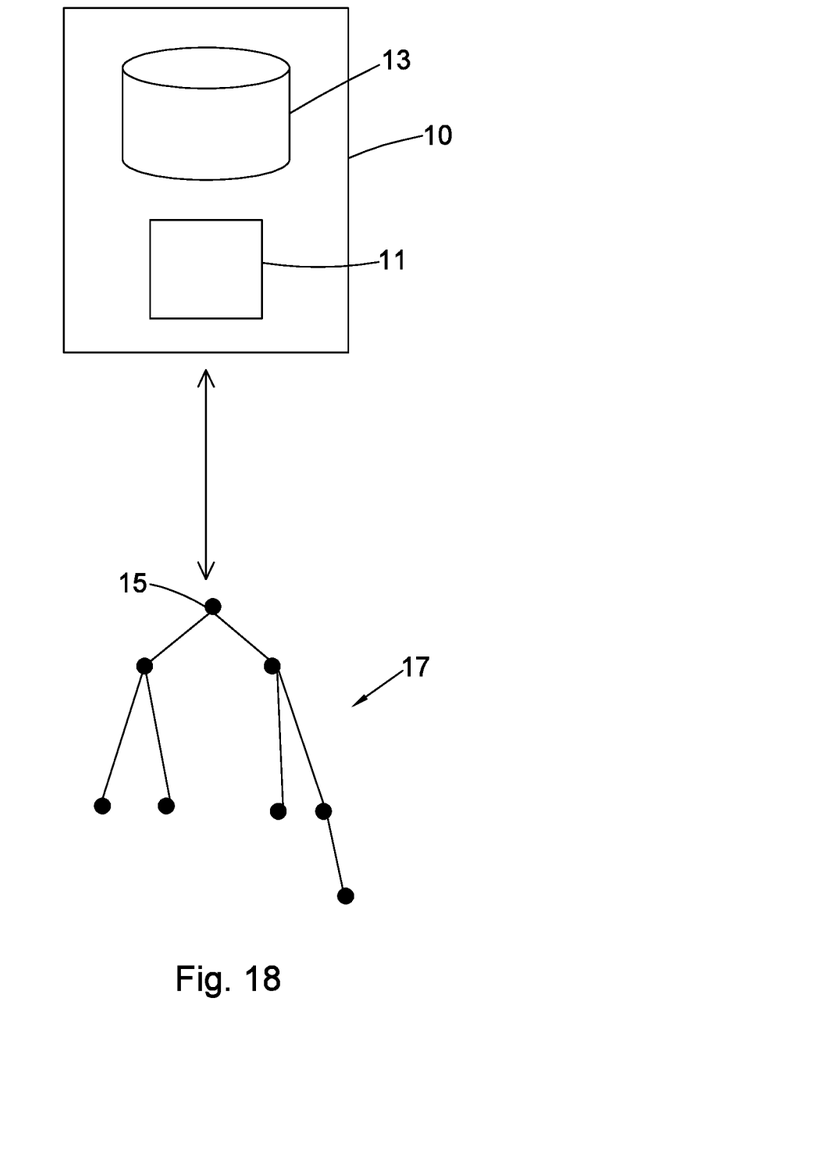
FIG. 18 shows the controller from FIG. 1 in communication with a network.

With reference to FIG. 18, the controller 10 includes a processor 11 and a memory 13, storing instructions in the form of electronic data. The instructions are arranged to be executed by the processor 11, for performing the embodiment described above. The controller 10 is shown in communication with a node 15 of the network 17. The node 15 in communication with the controller 10 may be known as the control node.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. An electronic apparatus, comprising:
   processing circuitry configured to
      detect a communication type for processing an application over a network, wherein the communication type indicates one of one-to-one communication, one-to-multiple communication, and multiple-to-one communication;
      select a first set of phases from a pre-defined set of phases when the communication type indicates one-to one communication;
      select a second set of phases from the pre-defined set of phases when the communication type indicates one-to-multiple communication;
      select a third set of phases from the pre-defined set of phases when the communication type indicates multiple-to-one communication, wherein the first set, the second set, and the third set of phases are building blocks of a period when the electronic apparatus can initiate control across the network; and
      construct a protocol to configure nodes of the network to respond to the application in accordance with one of the selected first set of phases, the selected second set of phases, and the selected third set of phases.

2. The apparatus of claim 1, wherein the apparatus configures the nodes to respond to the application by selecting one mode of a source mode, a destination mode, and a forwarder mode.

3. The apparatus of claim 1, wherein the phases are scheduled in a time synchronous manner.

4. The apparatus of claim 1, wherein each phase includes a generic flood primitive to configure each node of the network.

5. The apparatus of claim 4, wherein each phase includes pre- and post-processing logic, the pre-processing logic being configured to modify the generic flood primitive based on a current performance of the network, and the post-processing logic being configured to detect a performance of the network in responding to the generic flood primitive.

6. The apparatus of claim 1, wherein each phase includes a guard time period.

7. The apparatus of claim 1, wherein each phase includes an offset time period.

8. The apparatus of claim 1, wherein the processing circuitry is further configured to divide a data processing epoch into a control plane and a subsequent data plane, transmit the phases to the network in the control plane, and transmit the application data to the network in the data plane.

9. A low-power, wireless, software defined network (SDN), comprising:
   a plurality of nodes; and
   the electronic apparatus of claim 1 to configure the nodes of the network to process the application over the network.

10. A method, comprising:
   detecting a communication type for processing an application over a network, wherein the communication type indicates one of one-to-one communication, one-to-multiple communication, and multiple-to-one communication;
   selecting a first set of phases from a pre-defined set of phases when the communication type indicates one-to-one communication;
   selecting a second set of phases from the pre-defined set of phases when the communication type indicates one-to-multiple communication;
   selecting a third set of phases from the pre-defined set of phases when the communication type indicates multiple-to-one communication, wherein the first set, the second set, and the third set of phases are building blocks of a period when the electronic apparatus can initiate control across the network; and
   constructing a protocol to configure nodes of the network to respond to the application in accordance with one of the selected first set of phases, the selected second set of phases, and the selected third set of phases.

11. The method of claim 10, wherein the nodes respond to the application in a mode that is one of a source mode, a destination mode, and a forwarder mode.

12. The method of claim 10, further comprising scheduling the phases in a time synchronous manner.

13. The method of claim 10, wherein each phase includes a generic flood primitive to configure each node of the network.

14. The method of claim 13, further comprising detecting a performance of the network in responding to the generic flood primitive, and modifying a subsequent flooding primitive based on the performance of the network.

15. The method of claim 10, further comprising scheduling the phases to include a guard time period.

16. The method of claim 10, further comprising scheduling the phases to include an offset time period.

17. The method of claim 10, further comprising dividing a data processing epoch into a control plane and a subsequent data plane, transmitting the phases to the network in the control plane, and transmitting application data to the network in the data plane.

18. A non-transitory computer-readable memory storing computer program instructions for execution by processing circuitry, the instructions, when executed by the processing circuitry, causing the processing circuitry to perform the method claimed in claim 10.

\* \* \* \* \*